UNITED STATES PATENT OFFICE 2,438,939

QUICK-COOKING RICE AND PROCESS FOR MAKING SAME

Ataullah K. Ozai-Durrani, Stuttgart, Ark., assignor to General Foods Corporation, New York, N. Y., a corporation of Delaware No Drawing. Application March 23, 1942, Serial No. 435,902

22 Claims. (Cl. 99—80)

This invention relates to quick-cooking dry rice, as well as to a method of producing the same, and is a continuation in part of my prior application Serial No. 390,107, filed April 24, 1941, now abandoned.

Dry rice of the type usually found on the market comprises relatively dense, hard, and dry grains consisting largely of raw starch and having a moisture content of around 8–14%. In cooking such rice for the table, the raw starch is hydrated and gelatinized to a soft, palatable condition and the moisture content is increased to about 65–80%, depending on personal preference. If soaked without heating, rice starch will absorb only about 25–30% moisture, and will not be gelatinized, although the rice grains will become friable and can be reduced to a soft powder with light pressure. With heating, on the other hand, the rice starch undergoes gelatinization with concomitant absorption of additional moisture, and the rice grains swell to several times their normal size. With the customary varieties this gelatinization and swelling occurs at temperatures in the approximate range of 65–75° C., and if allowed to proceed far enough, the starch cells burst and a viscous, sticky paste is formed.

In order to obtain a thoroughly cooked, palatable product of attractive taste and appearance, it is desirable in cooking rice to gelatinize the starch throughout the entire grain sufficiently to render the product soft and palatable but not to such an extent as to cause excessive bursting of the starch cells. In the ordinary preparation or cooking of rice in the kitchen, however, this objective is attained only with much difficulty, a fact which has militated against the general use of rice as an article of diet. Relatively long cooking is required to gelatinize the starch at the center of the rice grain because the moisture is first absorbed by the surface starch cells which become gelatinized and swollen before the moisture can penetrate to the interior of the grain. Consequently, by the time the starch at the center is gelatinized, the surface starch cells have been over-cooked and burst and the rice tends to form a soggy, sticky, and unpalatable mass. This condition can be avoided only by careful control of the cooking procedure, occasioning increased time and trouble, or by thorough washing of the cooked grains to remove most of the sticky over-cooked surface starch which results in a loss of as much as 25% of the nutritive value of the rice.

With the object of reducing cooking time in the kitchen, it has been proposed heretofore to pre-cook raw rice and to dry and market it in this form, but as far as I am aware none of such prior proposals has met with practical success. Dried previously cooked starch is capable of absorbing moisture more readily than dry raw starch, but in either case the time required for complete hydration of the individual grains is largely dependent on the ease with which moisture can penetrate to the interior of the grains. Rice when pre-cooked and dried as heretofore proposed shrinks back to its original volume and forms dense, glassy-like grains into which moisture can penetrate only with difficulty. Thus little or none of the intended benefit of precooking is secured by such procedures.

Moreover, the effort to save as much cooking time as possible in the kitchen by completely pre-cooking the rice involves still other complications. The effects of surface over-cooking are magnified on drying by the formation of hard lumps or masses which have no consumer appeal and in which the individual grains are scarcely recognizable. Reduction of these lumps to grain size can be accomplished only with great difficulty, and is accompanied by a loss in fines and broken pieces which is excessive. Such lumping can be minimized by only partially pre-cooking the rice, as suggested in some prior procedures, but whether the rice be partially or completely pre-cooked, the housewife will still be confronted, when preparing such products for the table, with the problem of preventing surface over-cooking and consequent loss of nutritive values and agglomeration of the cooked product. Therefore, despite its fitness as a food, rice continues to be marketed in the raw state and to play only a minor role in the diet because of the disadvantages attendant upon its preparation for consumption.

Accordingly, one of the objects of the invention is to provide a dry, quick-cooking rice which can be prepared for consumption in a much shorter time than either raw rice or rice processed as heretofore proposed.

Another object is to provide a dry, pre-cooked rice which can quickly and easily be prepared for consumption without agglomeration or loss of nutritive values.

Still another object is to provide a dry, quick-cooking rice consisting of enlarged natural-appearing grains having a porous structure capable of ready hydration to the soft, palatable state of ordinary cooked rice.

A further object is to provide a novel method of producing a rice product of the above character without substantial loss of nutritive values and without alteration of the general appearance and unitary character of the rice grains.

I have found that the above objects can be attained by treating rice grains with moisture and heat in such a way as to gelatinize the starch and cause the grains to soften and swell substantially beyond their original size, without substantial loss of nutritive values or destruction of the individual identity of the grains, and then drying the swollen grains in such a manner as to preserve their enlarged size and produce a porous structure throughout the grains on shrinkage of the internal starch. Different varieties of rice vary considerably in shape and physical characteristics. Depending on the variety of rice processed and the processing conditions, the porous structure of the grains may take the form of a multitude of more or less generally distributed cells or pockets, or of a smaller number of larger voids, or in some cases of a single hole extending longitudinally of the entire grain.

Rice of the form described above has exceptional quick-cooking properties. Being gelatinized, the starch is capable of absorbing moisture much more quickly than raw starch, and the rice grain being porous, the maximum benefit of this increased rate of moisture absorption is obtained when the rice is cooked in water preparatory to consumption. The highly porous or sponge-like structure of the grains permits the cooking water to reach the internal starch as readily as the surface starch with the result that hydration and any further gelatinization take place substantially simultaneously throughout the grains. Moreover, due to the expanded porous character of the grains, such hydration and gelatinization are carried to completion in considerably less time than in the case of either raw rice or the pre-cooked and dried products of prior procedures in which the starch existed in the form of dense masses.

Another advantage of the present product when prepared for use is that hydration and any further gelatinization are accomplished so rapidly and easily that there is no danger of surface overcooking with its attendant drawbacks. Accordingly the rice can be cooked in just that amount of water which can be absorbed by the grains, thereby eliminating drainage and loss of nutritive values. As the starch hydrates, it swells and closes up the voids, resulting in a cooked product consisting of readily separable grains free of surface stickiness and having a uniform soft, palatable texture and consistency throughout.

When properly pre-cooked and dried, processed rice as described above has the shape and general appearance of selected, extra large, rice grains. Although the starch has been gelatinized, the characteristic shiny or glassy appearance of ordinary dried, gelatinized starch is absent, due to the porosity of the grains. The grains have an attractive, characteristic appearance, which depends on whether brown or white rice is used, and when broken, their porous internal structure is readily apparent. As previously indicated, this porosity may take various forms and in some varieties of rice, as for instance Nira and Fortuna, will usually appear as a large center hole running lengthwise of a substantially tubular, thin-walled grain. In preparing the product of the present invention for the table, it is sufficient simply to cook it for about 2 to 3 minutes in such amount of water as will be completely absorbed by the rice and then permit it to stand for a few minutes. In most instances this will require about 1 to 1½ volumes of water for each volume of rice. However, one of the advantages of the present product, particularly if substantially complete gelatinization has occurred during pre-cooking, is that it can be readily hydrated and rendered palatable merely by soaking it in warm or even cold water, milk, or the like. This makes it especially adaptable for use in rice pudding preparations and the like.

In producing a product having the characteristics described above, perhaps the most important factor is the manner in which the pre-cooked rice is dried. The grains must first be cooked under conditions such that they absorb enough moisture to cause substantial swelling, preferably to two or more times their normal size. Broadly speaking, drying should then be conducted in such manner that moisture is removed from the surfaces of the grains at a rate sufficiently faster than it can diffuse to the surfaces from the interior of the grains as to cause formation of a comparatively dry outer layer or shell on the grains while they are still wet and swollen. Thus the grains will be set or fixed in their enlarged, expanded condition and the shrinkage of the internal starch which takes place on further drying will result in the formation of the porous structure heretofore described. The more nearly the grains are set in their fully enlarged and expanded condition, the greater will be the extent of porosity of their interiors and consequently the higher will be their ability to absorb moisture on subsequent cooking. Although pre-cooking of the rice may be carried out in any suitable manner insuring proper gelatinization and swelling, I have found that for best results certain conditions should be observed. Thus the manner in which gelatinization of the starch is accomplished appears to have an effect on the extent of porosity obtained in the rice on subsequent drying. On the other hand, complete gelatinization is unnecessary to the attainment of a porous, dried product, and in fact may even be undesirable.

These factors and their effects on different varieties of rice are discussed more in detail hereinafter in connection with a specific description of my presently preferred method of producing the product of the present invention. It will be understood, however, that the method set forth is subject to variations which will be apparent to those skilled in the art, and also that the described product is not limited by the herein disclosed method of making it but may be produced in any suitable way.

As previously mentioned, the manner in which gelatinization of the rice starch is effected seems to play a part in the distribution of the voids in the grains, which may vary somewhat as stated above, although just why this should be the case is not entirely understood at present. In particular, I have found that soaking of the rice to increase its moisture content before pre-cooking tends to bring about the formation of one or more centrally disposed voids of large size, facilitating access of water to the interior of the grains and tending to decrease the time required for hydration. Hence soaking of the rice is generally preferred, although the effect of such large, central voids varies in importance with grains of different sizes and shapes, provided the expanded, generally porous structure of the grains is maintained. In the case of long grains of approximately round cross-section, such as Nira rice for example, the formation of one or more large center holes results in roughly tubular, thin-shelled grains requiring a substantially shorter time for hydration than grains not having such holes. On the other hand, with Blue Rose and similar varieties of rice having relatively flat, thin grains, the effect of center holes on the time required for hydration is less important.

Apart from its effect on center hole formation, soaking has other advantages in the present process because it enables gelatinization to proceed more uniformly throughout the grains. This permits the desired degree of gelatinization to be obtained at the centers of the grains in a shorter time and with a minimum of overcooking at their surfaces. Accordingly, fewer surface starch cells are burst and the starch losses during pre-cooking are minimized. In addition, the tendency of the individual grains to stick together and form masses or lumps prior to and during subsequent drying is greatly reduced. Moreover, splitting of the grains which occurs on prolonged pre-cooking is practically eliminated and their shape and smooth outer surfaces are preserved.

When soaking is employed it may be carried out at any temperature below the gelatinization point of the rice starch, which varies from about 65°–75° C. with different varieties. Below this point, the ability of the rice to absorb moisture is practically independent of temperature so either cold or warm water may be used. When the grain has absorbed the maximum amount of water, it is friable and can be reduced to a soft powder by light crushing. This condition is attained with most varieties at 25–30% moisture on a wet basis, the soaking time required varying from 30–60 minutes depending on the size and type of grain. Higher moisture contents can be obtained in less time at temperatures above the gelatinization point, but the adverse effects of slow or prolonged cooking become manifest and hence such temperatures are undesirable.

The soaked or unsoaked rice may be pre-cooked in any suitable way to obtain the desired degree of gelatinization of the starch throughout the grain, for example, by immersion in boiling water. Preferably, the cooking temperature should not be allowed to fall below 95°–100° C., as cooking at lower temperatures for longer periods is apt to cause splitting of the grains, etc. The pre-cooking time will depend in part on the type and size of grain and the temperature, but principally on the extent of gelatinization desired. As indicated above, the degree of gelatinization of the starch during pre-cooking influences the time required for hydration or preparation in the kitchen, so pre-cooking may be carried to the extent of complete gelatinization of the starch, if desired. However, the losses occurring during such pre-cooking will be higher, there may be massing or lumping of the rice during drying, and split or ragged grains of poor appearance may be formed. On the other hand, I have found that complete gelatinization is not necessary to the formation of a porous grain structure, and since the small reduction in hydration time obtained by carrying pre-cooking to the final stages of gelatinization is not of practical importance, I prefer to avoid the losses and other difficulties mentioned above by limiting pre-cooking to a point of substantial but less than complete gelatinization.

Taking polished Nira and Blue Rose rice as examples, complete gelatinization of the rice, if soaked, is obtained in boiling water in about 12–14 minutes, whereas the preferred condition of substantial but less than complete gelatinization is reached in about 8–10 minutes. On the other hand, if the rice is not soaked, about 25–27 minutes is required to produce complete gelatinization and 21–23 minutes to obtain the preferred condition. At the latter point the rice contains about 65–70% moisture on a wet basis, which figure may be used as a measure of the pre-cooking time required. Another somewhat rougher but practical test of the extent of gelatinization of the rice is to crush a number of the wet grains against a dark surface, when ungelatinized starch, if present, appears as a white spot. By this test, the preferred degree of gelatinization is reached when white centers are present in only about 50% of the grains. Still another method of determining the extent of gelatinization is to subject the pre-cooked rice starch to the action of beta amylase, the preferred condition being reached when 85–90% of the starch has been gelatinized as shown by this test. For any given pre-cooking conditions and variety of rice, pilot runs will readily establish the time required to attain the desired degree of gelatinization in practice.

To prevent further self-cooking of the rice and insure a uniform degree of gelatinization, it is desirable to cool the rice promptly after the expiration of the desired pre-cooking period. This may be accomplished by its prompt removal from the cook water followed by its exposure to a blast of cold air or immersion in cold water. The cooling step can be omitted and self-cooking taken into account in determining the pre-cooking time, but besides enabling more accurate control of gelatinization it has a number of other practical advantages in that it reduces surface stickiness, facilitates subsequent drying without lumping and renders the grains less liable to breakage in subsequent handing.

As heretofore stated, the pre-cooked rice should be dried under such conditions that moisture is removed from the surfaces of the grains at a rate sufficiently faster than it can diffuse to the surfaces from the interiors as to cause formation of a comparatively dry outer layer or shell on the grains while they are still wet and swollen. Such drying sets or fixes the grains in their enlarged, expanded condition and results in the formation of the porous structure heretofore described, whereas the drying procedures of the prior proposals previously mentioned result in shrunken, dense grains having a glassy, unnatural appearance. Broadly speaking, any drying method or apparatus can be used which accomplishes this result, as for instance a belt or tray dryer employing a circulating gas of suitable temperature and humidity as the drying medium.

Good results have been obtained by spreading the wet rice in a layer on a supporting screen and blowing relatively dry, heated air upwardly therethrough. The upward current of air tends to separate the grains thereby preventing matting and insuring thorough air circulation around each grain. With appropriate air velocity and humidity, drying may be carried out at room temperature, but it is usually preferable to accelerate drying by heating the air, although temperatures exceeding about 140° C. should be avoided to prevent scorching the rice. Usually it will be desirable to dry the rice to about 8–14% moisture, but it may be dried to a lower figure if desired.

The following detailed procedures will serve to illustrate the practical application of the above principles, but they are given by way of example only and are not to be construed as defining the scope of the invention, reference being had for that purpose to the appended claims.

Milled rice after cleaning to free the grains of foreign matter is soaked in water at room temperature for a period of 30–40 minutes, after which the moisture content of the grains is about 25–30% on a wet basis. The rice is then drained and pre-cooked by immersion in boiling water, preferably about 7–14 volumes of water to 1 volume of rice, for a period of about 8–10 minutes. Stirring may be employed during boiling if desired. The rice is then removed from the cook water, immersed in cold water for 1–2 minutes, and thereafter drained. During the cooling and draining, any agglomerated grains can be separated by gentle agitation or combing.

The pre-cooked and cooled grains are spread in a layer on a screen and dried by forced air circulation. The layer should not be more than about 1 inch in depth so as to allow free passage of the drying air therethrough and to insure that each grain is subjected to the desired drying conditions. With an air inlet temperature of 140° C. and an air velocity through the grains of 200 feet per minute, the grains are dried to 8–14% moisture in 10 to 15 minutes. Should there be any tendency toward agglomeration during drying, the rice can be stirred or otherwise agitated.

When so treated, the dried grains are enlarged to about twice their original volume and have the shape and general appearance of rice grains. In the case of Nira and similar varieties of rice, the grains have the characteristic thin-shelled, tubular structure described above, while in the case of flat, thin grain varieties such as Blue Rose, the grains have a generally porous structure with a less pronounced center hole. The loss of nutritive values from the rice during pre-cooking and subsequent steps is not more than about 11–12%, the number of split or otherwise damaged grains is small, and the proportion of agglomerated grains which cannot be broken up by gentle rubbing is negligible.

When soaking is not employed, milled rice after appropriate cleaning to free it of foreign matter is pre-cooked in an excess of boiling water as in the previous example for a period of 21–23 minutes, after which it is cooled, drained, and dried as before. The loss of nutritive values from rice treated in this manner and the number of split and damaged grains is somewhat higher than in the previous case. However, the grains possess the same expanded, generally porous structure, although with a lower proportion of large voids.

Rice prepared as above can be quickly and easily hydrated and reconstituted to the taste, flavor, consistency, texture, and appearance of the same properly cooked raw rice merely by immersion in warm or hot water for a few minutes. Moreover, the rice can be so reconstituted without loss, and without caking as well, by using just that amount of water which can be absorbed by the grains. For example, the rice may be immersed in 1 to 1½ volumes of boiling water to each volume of rice for a period of about 2–3 minutes and then allowed to stand for a few minutes to permit free water to be absorbed, after which it will be ready for serving.

It will be understood that the details set forth above are by way of example only and that various procedural modifications within the spirit of the invention will occur to those skilled in the art. It will be evident further that the various steps of the procedure may be performed with the aid of any known apparatus suitable under particular operating conditions to enable adjustment of time, temperature, rate of drying, and similar factors according to the principles set forth above and to obtain the desired expanded, porous product. The procedure may be applied to any desired variety of rice, whether brown or white, hulled or polished, and when so desired, vitamins and other nutritive principles normally lost in milling rice may be added to the product in any suitable way, as by immersing the grains in or spraying them with a solution thereof before or after drying. Accordingly, reference should be had to the appended claims for a definition of the limits of the present invention.

I claim:

1. A quick-cooking rice product comprising dried, separate, substantially gelatinized rice grains having of the order of twice their original volume and a porous structure capable of ready hydration to individual grains having the soft, palatable character of ordinary cooked rice.

2. A quick-cooking rice product comprising dried, separate, substantially gelatinized rice grains of substantially greater volume than the original grains and having a porous structure characterized by the presence of at least one large, centrally disposed void, said product being capable of ready hydration to individual grains having the soft, palatable character of ordinary cooked rice.

3. A quick-cooking rice product comprising dried, separate, substantially gelatinized rice grains having porous, substantially tubular shells of greater volume than the original grains and at least one longitudinally extending center hole, said product being capable of ready hydration to individual grains having the soft, palatable character of ordinary cooked rice.

4. A process of preparing a quick-cooking rice product which comprises subjecting rice to heat and moisture to gelatinize the starch substantially and increase the moisture content of the grains to at least about 65–70% with substantial swelling of the grains, and then drying the swollen grains by removing moisture from their surfaces at a rate sufficiently faster than it can diffuse thereto from their interiors as to set them in their enlarged condition and produce a porous structure therein.

5. A process of preparing a quick-cooking rice product which comprises cooking rice in water to gelatinize the starch and cause swelling of the grains for a period sufficient to increase the moisture content of the grains to at least about 65–70% but not great enough to cause substantial damage thereto, then cooling the grains to prevent further gelatinization of the starch, and thereafter drying the swollen grains by removing moisture from their surfaces at a rate sufficiently faster than it can diffuse thereto from their interiors as to set them in their enlarged condition and produce a porous structure therein.

6. A process of preparing a quick-cooking rice product which comprises cooking rice in an excess of boiling water until its starch is substantially gelatinized with concomitant substantial swelling of the grains and its moisture content is raised to at least about 65–70%, then cooling the rice to prevent further gelatinization of the starch, and thereafter drying the grains by removing moisture from their surfaces at a rate sufficiently faster than it can diffuse thereto from their interiors as to set them in their enlarged condition and produce a porous structure therein.

7. A process of preparing a quick-cooking rice product which comprises soaking rice at a temperature below the gelatinization point of its starch until it has absorbed substantially the maximum amount of water, then subjecting the rice to heat in the presence of additional moisture to gelatinize the starch at least substantially and cause absorption of added moisture to increase the moisture content to at least about 65-70% with substantial swelling of the grains, and thereafter drying the swollen grains by removing moisture from their surfaces sufficiently faster than it can diffuse thereto from their interiors as to set them in their enlarged condition and produce a porous structure therein.

8. A process of preparing a quick-cooking rice product which comprises soaking rice at a temperature below the gelatinization point of its starch until it has absorbed substantially the maximum amount of water, then cooking the rice in water to gelatinize the starch and cause swelling of the grains for a period sufficient to increase the moisture content of the grains to at least about 65-70% but not great enough to cause substantial damage thereto, then cooling the grains to prevent further gelatinization of the starch, and thereafter drying the swollen grains by removing moisture from their surfaces at a rate sufficiently faster than it can diffuse thereto from their interiors as to set them in their enlarged condition and produce a porous structure therein.

9. A process of preparing a quick-cooking rice product which comprises soaking rice at a temperature below the gelatinization point of its starch until it has absorbed substantially the maximum amount of water, then cooking the rice in an excess of boiling water until its starch is substantially gelatinized with concomitant substantial swelling of the grains and its moisture content is raised to at least about 65-70%, then cooling the rice to prevent further gelatinization of the starch, and thereafter drying the grains by removing moisture from their surfaces at a rate sufficiently faster than it can diffuse thereto from their interiors as to set them in their enlarged condition and produce a porous structure therein.

10. A process of preparing a quick-cooking rice product which comprises cooking rice in an excess of boiling water to gelatinize the starch substantially and raise its moisture content to at least about 65-70% with substantial swelling of the grains, and then drying the swollen grains by removing moisture from their surfaces at a rate sufficiently faster than it can diffuse thereto from their interiors as to set them in their enlarged condition and produce a porous structure therein.

11. A process of preparing a quick-cooking rice which comprises cooking rice in water to gelatinize the starch and cause moisture absorption with concomitant swelling of the grains for a period sufficient to increase their moisture content to at least 65-70%, and then drying the swollen grains by removing moisture from their surfaces at a rate sufficiently faster than it can diffuse thereto from their interiors as to set them in their enlarged condition and produce a porous structure therein.

12. A process of preparing a quick-cooking rice which comprises soaking rice at a temperature below the gelatinization point of its starch until it has absorbed substantially the maximum amount of water, then cooking the rice in an excess of boiling water to gelatinize the starch substantially and raise its moisture content to at least about 65-70% with substantial swelling of the grains, and then drying the swollen grains by removing moisture from their surfaces at a rate sufficiently faster than it can diffuse thereto from their interiors as to set them in their enlarged condition and produce a porous structure therein.

13. A process of preparing a quick-cooking rice which comprises soaking rice at a temperature below the gelatinization point of its starch until it has absorbed substantially the maximum amount of water, then cooking the rice in water to gelatinize the starch and cause further moisture absorption with concomitant swelling of the grains for a period sufficient to increase their moisture content to at least 65-70%, and then drying the swollen grains by removing moisture from their surfaces at a rate sufficiently faster than it can diffuse thereto from their interiors as to set them in their enlarged condition and produce a porous structure therein.

14. A process of preparing a quick-cooking rice product which comprises subjecting rice to heat and moisture to gelatinize the starch substantially and increase the moisture content of the grains to at least about 65-70% with substantial swelling of the grains, and then drying the swollen grains by circulating heated air through the grains to remove moisture from their surfaces at a rate sufficiently faster than it can diffuse thereto from their interiors as to set them in their enlarged condition and produce a porous structure therein.

15. A process of preparing a quick-cooking rice product which comprises cooking rice in water to gelatinize the starch substantially and raise its moisture content to at least about 65-70% with substantial swelling of the grain, and then drying the swollen grains by circulating air at a temperature of the order of 140° C. through the grains to remove moisture from their surfaces at a rate sufficiently faster than it can diffuse thereto from their interiors as to set them in their enlarged condition and produce a porous structure therein.

16. A process of preparing a quick-cooking rice product which comprises cooking rice in an excess of boiling water to gelatinize the starch substantially and raise its moisture content to at least about 65-70% with concomitant substantial swelling of the grains, and then drying the swollen grains by circulating heated air through the grains to remove moisture from their surfaces at a rate sufficiently faster than it can diffuse thereto from their interiors as to set them in their enlarged condition and produce a porous structure therein.

17. A process of preparing quick-cooking rice which comprises cooking rice in water to gelatinize the starch and cause moisture absorption with concomitant swelling of the grains for a period sufficient to increase their moisture content to at least 65-70%, and then drying the swollen grains by circulating heated air through the grains to remove moisture from their surfaces at a rate sufficiently faster than it can diffuse thereto from their interiors as to set them in their enlarged condition and produce a porous structure therein.

18. A process of preparing quick-cooking rice which comprises soaking rice at a temperature below the gelatinization point of its starch until it has absorbed substantially the maximum amount of water, then cooking the rice in water to gelatinize the starch and further increase its moisture content to at least 65-70% with concomitant swelling of the grains, and then drying the swollen grains by circulating heated air through the grains to remove moisture from their surfaces at a rate sufficiently faster than it can diffuse thereto from their interiors as to set them in their enlarged condition and produce a porous structure therein.

19. A process of preparing quick-cooking rice which comprises soaking rice at a temperature below the gelatinization point of its starch until it has absorbed substantially the maximum amount of water, then cooking the rice in water to gelatinize the starch and further increase its moisture content to at least 65-70% with concomitant swelling of the grains, then cooling the grains to prevent further cooking of the starch, and then drying the swollen grains by circulating heated air through the grains to remove moisture from their surfaces at a rate sufficiently faster than it can diffuse thereto from their interiors as to set them in their enlarged condition and produce a porous structure therein.

20. A process of preparing quick-cooking rice which comprises soaking rice at a temperature below the gelatinization point of its starch until it has absorbed substantially the maximum amount of water, then cooking the rice in an excess of boiling water to gelatinize the starch and further increase its moisture content to at least 65-70% with concomitant swelling of the grains, then cooling the grains to prevent further cooking of the starch, and then drying the swollen grains by circulating heated air through the grains to remove moisture from their surfaces at a rate sufficiently faster than it can diffuse thereto from their interiors as to set them in their enlarged condition and produce a porous structure therein.

21. A process of preparing quick-cooking rice which comprises soaking rice at a temperature below the gelatinization point of its starch until it has absorbed substantially the maximum amount of water, then cooking the rice in an excess of boiling water to gelatinize the starch and further increase its moisture content to at least 65-70% with concomitant swelling of the grains, and then drying the swollen grains by circulating heated air through the grains to remove moisture from their surfaces at a rate sufficiently faster than it can diffuse thereto from their interiors as to set them in their enlarged condition and produce a porous structure therein.

22. A process of preparing a quick-cooking rice product which comprises cooking rice in an excess of boiling water to gelatinize the starch and raise its moisture content to at least about 65-70% with concomitant substantial swelling of the grains, then cooling the grains to prevent further cooking of the starch, and then drying the grains by circulating heated air through the grains to remove moisture from their surfaces at a rate sufficiently faster than it can diffuse thereto from their interiors as to set them in their enlarged condition and produce a porous structure therein.

ATAULLAH K. OZAI-DURRANI.

REFERENCES CITED

The following references are of record in the file of this patent:

UNITED STATES PATENTS

| Number | Name | Date |
|---|---|---|
| 1,399,920 | Baumgartner | Dec. 13, 1921 |
| 1,377,125 | Gurjar | May 3, 1921 |
| 1,364,912 | Baumgartner | Jan. 11, 1921 |
| 400,835 | Donelson | Apr. 2, 1869 |